United States Patent [19]

August

[11] 4,106,816
[45] Aug. 15, 1978

[54] HUB CAP FOR TRAILER WHEELS AND THE LIKE

[75] Inventor: William S. August, Altadena, Calif.

[73] Assignee: A-T-O Inc., Willoughby, Ohio

[21] Appl. No.: 810,808

[22] Filed: Jun. 28, 1977

[51] Int. Cl.$^2$ ............................................. B60B 27/00
[52] U.S. Cl. ........................... 301/108 R; 137/516.23; 308/96; 184/45 R; 184/1 D
[58] Field of Search ........................ 301/108 R, 108 A; 137/516.17–516.23, 543.21; 308/187, 187.1, 93, 95, 96; 184/45 R, 45 A, 1 D; 222/496, 497

[56] References Cited

U.S. PATENT DOCUMENTS

| 3,955,852 | 5/1976 | Puydt et al. | 301/108 R |
| 4,058,185 | 11/1977 | Ploeget | 184/1 D |

FOREIGN PATENT DOCUMENTS 426,534  6/1967  Switzerland ............................. 222/496

*Primary Examiner*—Robert B. Reeves
*Assistant Examiner*—H. Grant Skaggs
*Attorney, Agent, or Firm*—Harris, Kern, Wallen & Tinsley

[57] ABSTRACT

A hub cap for a vehicle wheel, such as a boat trailer, which hub cap retains grease and blocks water flow into the wheel bearing while providing for automatic expulsion of excess grease when pressure increases within the hub, such as is caused by heating during running. A hub cap with a housing for mounting on a vehicle hub and including a fixed central member within the housing having a boss projecting into the outer zone and carrying a grease fitting for injecting grease into the inner zone. A seal is slidably mounted within the housing and engages the boss in sealing engagement, closing openings in the central member blocking grease flow from the inner zone to the outer zone. A spring urges the seal into sealing engagement, while an increase of pressure within the inner zone moves the seal out of sealing engagement against the spring force.

6 Claims, 3 Drawing Figures

HUB CAP FOR TRAILER WHEELS AND THE LIKE

BACKGROUND OF THE INVENTION

This invention relates to hub caps for vehicles which hub caps incorporate grease fittings for injecting grease into wheel bearings and pressure relief structure for releasing grease under pressure without damaging other bearing seals and the like.

A typical use for a hub cap of this type is on a boat trailer where the trailer is submerged in the water during launching and recovery of the boat.

A wheel bearing is packed with grease. When the trailer is being towed, the bearings and grease heat up and the grease expands. Air and grease are forced from the structure. When the hot trailer is immerged in water during launching, there is a sudden cooling and contraction of the grease when tends to create a vacuum and suck water into the bearing area. This is highly undesirable. If the bearing structure is packed full with grease and designed so that no air or grease can escape, another problem arises. When the vehicle is being towed, the grease heats and the pressure within the hub expands with the increased pressure causing damage to the bearing seals which may be on the inner side of the hub so that leaking grease is not immediately noticed with the result that the bearings become dry and freeze.

Several types of pressure relief hub caps have been produced in the past. One type is shown in U.S. Pat. No. 3,785,706 to Van Galis. In this device, a cup shaped seal is mounted within a cup shaped hub cap, with a spring acting on the seal to compress the grease within the hub. A first opening in the cap adjacent the outer end provides for pressure relief in the spring area between the seal and the outer end of the hub cap. A second opening in the hub cap inboard from the first opening provides for escape of grease when the pressure within the hub is sufficient to compress the spring.

Another type of hub cap is shown in U.S. Pat. No. 3,077,948 to Law. This structure utilizes a cup shaped seal sliding in a sleeve with a spring urging the seal inward to compress the grease. The sealing action occurs between the cup shaped seal and an 0-ring in the inner surface of the sleeve. A grease fitting is carried in the sliding seal for introducing grease into the hub.

The hub cap of the U.S. Pat. No. 3,785,706 patent suffers from the disadvantage that grease can be added to the hub only by removing the hub cap. This problem is solved by the hub cap of the U.S. Pat. No. 3,077,948 patent. However there are still some disadvantages with this structure. When the hub is being filled with grease by a grease gun, the manual force utilized in holding the grease gun in place also acts to hold the sliding seal in fixed position so that excess pressure can be built up within the hub and the inner bearing seal can be damaged without the operator knowing of this fact. That is, the automatic pressure release operation is nullified by the force applied with the grease gun. Also, the cup shaped seal which slides within the outer sleeve or housing and engages the 0-ring for making a seal provides only limited area for escape of grease.

Accordingly, it is an object of the present invention to provide a new and improved hub cap for sealing against entrance of moisture while providing automatic release under high pressure. A further object is to provide such a hub cap wherein the automatic pressure release functions at all times, including the period when grease is being introduced into the hug. A further object is to provide a new and improved hub cap with an improved sealing construction which provides for a quick release of relatively high rate of flow of grease and a quick seal. Other objects, advantages, features and results will more fully appear in the course of the following description.

SUMMARY OF THE INVENTION

The preferred embodiment of the hub cap of the invention includes a housing with an open end for mounting on a vehicle hub and having a fixed central member which divides the housing into an inner zone and an outer zone. The central member carries a boss projecting into the outer zone and has one or more openings providing for escape of grease from the inner zone to the outer zone. A grease fitting is mounted in the boss and a seal is slidably mounted within the housing for moving into and out of sealing engagement with the boss. A spring is retained within the housing in the second zone and urges the seal toward the boss, with an increase in grease pressure within the first zone acting to compress the spring, move the seal out of engagement, and permit escape of grease.

DESCRIPTION OF THE PREFERRED EMBODIMENTS

Figure 1:
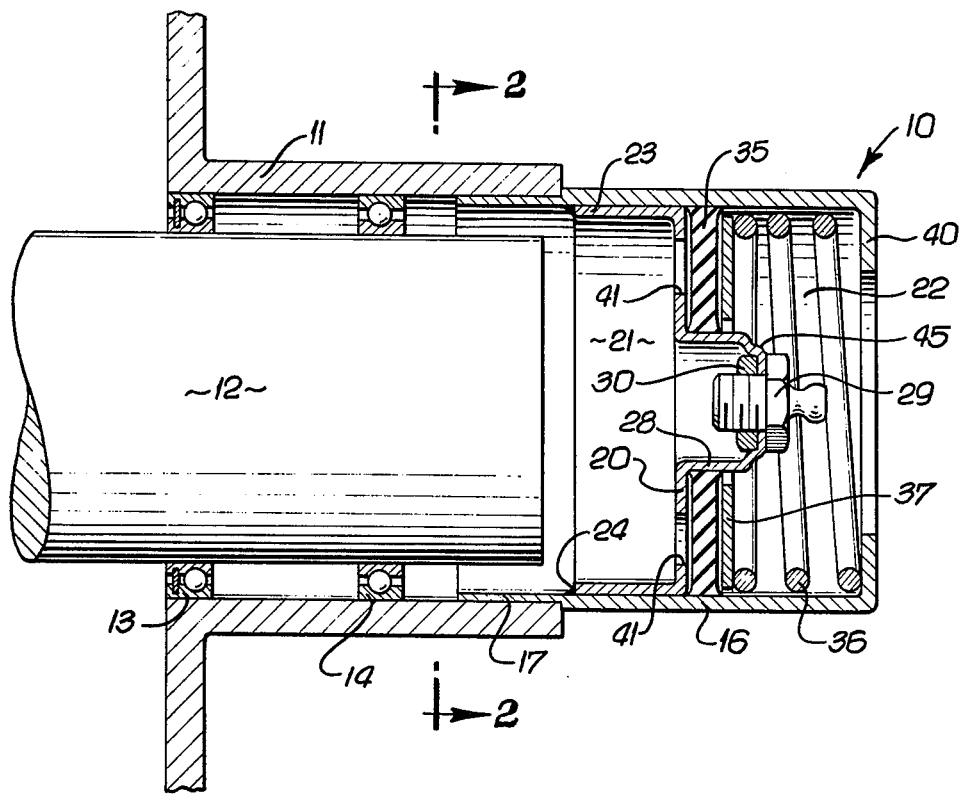
FIG. 1 is a sectional view through a hub cap mounted on a vehicle and showing the presently preferred embodiment of the invention.
Figure 2:
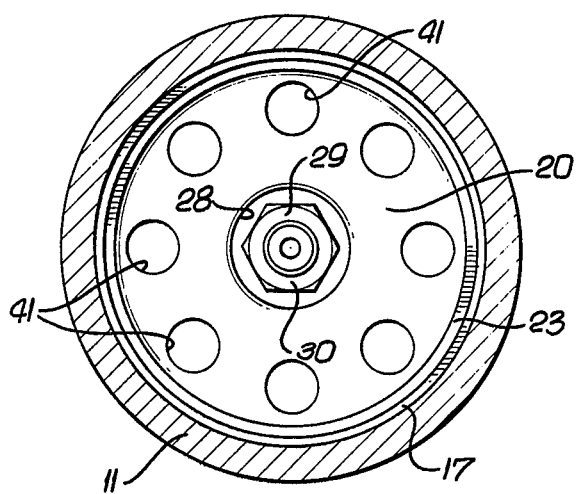
FIG. 2 is a sectional view taken along the line 2—2 of FIG. 1.

In FIG. 1, a hub cap 10 is mounted on a hub 11 of a vehicle, with the axle 12 mounted in the hub in bearings 13, 14. This is a typical installation for a hub cap on a vehicle, such as on a trailer for boats and the like. The axle and hub are shown diagramatically in the drawing and usually will have more complex configurations, such as shown in U.S. Pat. Nos. 2,657,104 and 3,785,706.

The hub cap includes a housing 16 which is designed to be a force fit into the hub 11. This may be accomplished by appropriately machining a reduced diameter section 17 on the housing 16. A central member 20 is carried within the housing 16 dividing the housing into an inner zone 21 and an outer zone 22. The central member 20 is fixed within the housing and may be manufactured in various configurations. A spider assembly or a plurality of pieces may be utilized. The presently preferred form for the central member 20 is shown in FIG. 1, as a drawn single piece of metal with a tubular section 23 telescoped into the housing 16. The central member may be fixed by spot welding or bead welding as shown at 24 or otherwise as desired.

The central member 20 includes a boss 28 which projects into the outer zone 22, with a conventional grease fitting 29 mounted in a central opening in the boss 28 and held in place by a nut 30.

A seal 35 is positioned in the outer zone 22 for sealing engagement with the inner surface of the housing 16 and the outer surface of the boss 28. A spring 36 is retained within the housing in the outer zone and urges the seal toward the central member 20, preferably with a backup ring or pad 37 positioned between the spring and the seal. The spring 36 may be retained in place by a flange 40 formed at the outer end of the housing 16, or by a conventional retainer ring such as is shown in U.S. Pat. No. 3,077,948, or by dimpling the wall of the housing 16, or otherwise desired.

One or more openings 41 are provided in the central member 20 for grease flow from the inner zone 21 to the outer zone 22 when the seal 35 is moved to the right compressing the spring 36.

In operation, the hub cap is installed on the vehicle hub. A grease gun is affixed to the nipple of the grease fitting and the interior of the hub and the inner zone 21 are filled with grease. When the pressure within the hub builds up to a predetermined amount, as determined by the dimensions of the spring and other components, the pressure acting on the seal 35 through the openings 41 will move the seal to the right, compressing the spring 36. The seal will be moved out of engagement with the boss 28, permitting escape of grease around the boss into the outer zone 22. This operation gives the person applying the grease an indication of when the hub is filled. The grease gun is then removed. When sufficient grease has escaped to reduce the pressure, the spring will move the seal into sealing engagement with the boss as well as with the housing, thereby sealing the interior of the hub.

If the vehicle is immersed in water, the seal prevents entry of water into the interior of the hub. If the bearings and grease are heated during operation on the road, the pressure generated within the hub can compress the spring and move the seal to the right, permitting escape of grease to reduce the pressure within the hub. This operation is similar to that which occurs during the initial injection of grease. By choosing the parameters of the hub cap appropriately, automatic release of pressure can be accomplished at a value below that which will cause damage to the seal of the inner bearing 13. If a vehicle with hot hubs is immersed in water, as for launching a boat after towing, the cooling and contraction of the grease may produce a vacuum within the hub. However the seal 35 effectively provides sealing engagement with the hub and boss, thereby preventing entry of water into the hub.

The boss 28 preferably has a rounded or tapered or stepped configuration at the end 45 for the purpose of providing a relatively large area for grease escape, once the seal has moved out of engagement with the larger diameter portion of the boss. This reduction in size provides a quick release and quick seal operation as the seal 35 moves out and in. The main portion of the boss 28 is cylindrical or only slightly tapered so that the seal 35 maintains good grease sealing engagement with the boss until the seal moves outward to the end portion 45.

Figure 3:
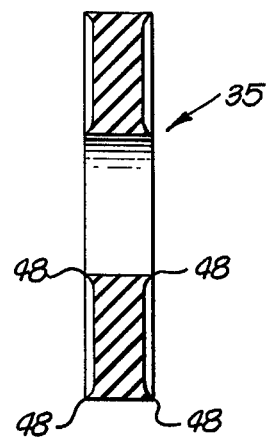
FIG. 3 is an enlarged sectional view of the seal of the hub cap of FIG. 1.

The seal 35 may take various configurations and preferably is a molded synthetic, such as polyurethane. An enlarged cross section of the presently preferred configuration for the seal is shown in FIG. 3. The seal is an annular disc with lips 48 at each inner edge and each outer edge for enhancing the sealing capability. This type of sliding seal is preferred, although other configurations could be used, such as a metal plate with 0-ring seals.

I claim:

1. In a hub cap for a vehicle wheel, the combination of:
    a housing having a first open end for mounting on a vehicle and a second opposite end,
    said housing including a fixed central member dividing said housing into an inner zone and an outer zone and having at least one opening for providing for grease flow between said zones,
    said central member including a boss projecting into said outer zone;
    a grease fitting mounted in said boss of said central member;
    a seal slidable in said outer zone between a first sealing position in sealing engagement with said housing and said boss and a second non-sealing position out of engagement with said boss; and
    a spring retained in said outer zone and urging said seal toward said first position.

2. A hub cap as defined in claim 1 including an annular ring positioned between said spring and seal.

3. A hub cap as defined in claim 1 wherein said housing has an inwardly turned flange at said second end for retaining said spring.

4. A hub cap as defined in claim 1 wherein said boss has an inner portion engagable with said seal and an outer portion of reduced size providing a grease flow path between said seal and boss outer portion when said seal is in said second position.

5. A hub cap as defined in claim 1 wherein said seal is a unitary annular disc with tapered lips at both inner and both outer edges.

6. A hub cap as defined in claim 1 wherein said housing includes a first tubular member, and said central member has a tubular base telescoped into said first tubular member.

* * * * *